(12) United States Patent
Oh

(10) Patent No.: US 6,480,964 B1
(45) Date of Patent: Nov. 12, 2002

(54) USER INTERFACE POWER MANAGEMENT CONTROL TECHNIQUE FOR A COMPUTER SYSTEM

(75) Inventor: Chang-Kook Oh, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/377,862

(22) Filed: Aug. 20, 1999

(30) Foreign Application Priority Data

Aug. 20, 1998 (KR) .............................. 98-33775

(51) Int. Cl.⁷ .............................. G06F 1/26; G06F 1/28; G06F 1/30
(52) U.S. Cl. ....................................... 713/310; 713/320
(58) Field of Search .................................. 713/300–340

(56) References Cited

U.S. PATENT DOCUMENTS

| | | | |
|---|---|---|---|
| 5,630,142 A | * 5/1997 | Crump et al. ............... | 713/323 |
| 5,691,742 A | 11/1997 | O'Connor et al. | |
| 5,708,821 A | 1/1998 | Takikita | |
| 5,754,798 A | 5/1998 | Uehara et al. | |
| 5,832,285 A | 11/1998 | Shimada | |
| 5,856,822 A | * 1/1999 | Du et al. ..................... | 345/145 |
| 5,881,299 A | 3/1999 | Nomura et al. | |
| 5,987,613 A | * 11/1999 | Busch et al. ................. | 713/300 |
| 6,044,473 A | * 3/2000 | Kim ............................ | 713/320 |

* cited by examiner

*Primary Examiner*—Rupal Dharia
(74) *Attorney, Agent, or Firm*—Robert E. Bushnell, Esq.

(57) ABSTRACT

A computer system includes: a plurality of hardware devices, a power mode selector disposed on the computer system, for selecting one of a plurality of predetermined power management modes, and a system power manager for managing the computer system power in response to the selection of the power management mode. In this computer system, a user can set a power management mode by merely moving the power management selector upward and downward. It is, therefore, possible to remedy a drawback in that the user must set the power-down time of each hardware device. Beginners can easily set the power management mode, too, thereby reducing unnecessary power consumption of a computer.

21 Claims, 5 Drawing Sheets

USER INTERFACE POWER MANAGEMENT CONTROL TECHNIQUE FOR A COMPUTER SYSTEM

CLAIM OF PRIORITY

This application makes reference to, incorporates the same herein, and claims all benefits accruing under 35 U.S.C. §119 from my application COMPUTER SYSTEM WITH POWER MANAGEMENT FUNCTION AND CONTROL METHOD OF THE SAME filed with the Korean Industrial Property Office on Aug. 20, 1998 and there duly assigned Serial No. 33775/1998.

BACKGROUND OF THE INVENTION

1. Field of the Invention

The present invention relates to a computer system, and more particularly to a power management control technique for a computer system.

2. Description of the Related Art

Semiconductor technology has rapidly advanced over the last decade. This has led to the development of faster, more powerful semiconductor devices, which have resulted in faster and more sophisticated computer systems having greater capabilities and supporting more advanced peripheral devices. However, these sophisticated computer systems tend to consume greater amounts of power.

To reduce power consumption, a power-down technique is performed on selected hardware devices when the computer system has not been used for a predetermined period of time. Examples of the power-down techniques are to deactivate one or both of the horizontal/vertical synchronization signals transmitted to a display monitor, decrease the rotational frequency of a hard disk drive, and prompt a central processing unit (CPU) to enter into a system management mode (SMM).

An advanced power management (APM) system gradually reduces the power consumption of the computer system in proportion to the non-operating time of the computer system. An APM has been developed by the INTEL Co. and the MICROSOFT Co.

A portable computer includes a computer body, a liquid crystal display (LCD) panel which is combined with a hinge of the computer body and shows display data, a keyboard combined with a top of the computer body, a touch pad used as a pointing device, a floppy disk drive, and a battery supplying power for operating the portable computer.

Designed to become small, light, and high-performance and to contain the battery, the portable computer can be conveniently portable and used anywhere. However, the capacity of the battery is restricted to limit the time that the computer can be operated by supplying the power from the battery. Therefore, the power consumption of the battery should be minimized while using the portable computer.

To minimize the power consumption of the battery, the portable computer should perform a power management function which is implemented by presetting it through a power management program. In the MICROSOFT WINDOWS 95 software, the power management program is executed in the control panel. In proportion to the non-operating time of the computer system, the power-down time of each device is set in the power management program. The power management program transmits the set time (i.e., powered down time) to a basic input/output system (BIOS), so that the BIOS controls the power-down of each device.

It is, however, complicated and difficult for beginners to set the power management through the foregoing steps. Since the power of the computer system cannot be efficiently managed, the power consumption may be left alone. Thus, the time that the computer system is operated by the battery is reduced to waste the battery power.

Without the efficient power management of a desktop computer, the amount of power consumption increases.

The following patents each discloses features in common with the present invention but do not teach or suggest the power management control technique for a computer system of the present invention: U.S. Pat. No. 5,754,798 to Uehara et al., entitled COMPUTER SYSTEM WITH FUNCTION FOR CONTROLLING SYSTEM CONFIGURATION AND POWER SUPPLY STATUS DATA, U.S. Pat. No. 5,708,821 to Takikita, entitled PRINTING APPARATUS AND METHOD OF SAVING POWER OF THE SAME, U.S. Pat. No. 5,832,285 to Shimada, entitled BATTERY POWERED COMPUTER CAPABLE OF SWITCHING TO A SUSPEND MODE BASED ON THE CONNECTION STATUS OF AN EXTERNAL DEVICE, U.S. Pat. No. 5,881,299 to Nomura et al., entitled SELECTIVELY REMOVING POWER FROM MULTIPLE DISPLAY AREAS OF A DISPLAY UNIT.

The present invention overcomes the above noted drawbacks by providing a computer system which can easily set a power management mode for gradually reducing the power consumption of a computer in proportion to the non-operating time of a computer system.

According to the present invention, a computer system includes a plurality of hardware devices, a power mode selector, disposed on the computer system, for selecting one of a plurality of predetermined power management modes, and a system power manager for managing the computer system power in response to the selection of the computer management mode.

In the preferred embodiment, the power mode selector is one of a touch pad, a rotary switch, and a slide bar.

According to the present invention, the present invention tests whether the power mode selector has been moved. If the power mode selector has been moved, predetermined menus for selecting one of power management modes are altered and displayed in accordance with a moving direction of the power mode selector. If selection of the power management mode is finished, a selected mode is set as a power management mode. As a result, a user can set the power management mode of a computer system merely by moving a movable power mode selector.

In the preferred embodiment, if the power mode selector is not moved over a predetermined period of time or a specific key of a keyboard has not been pressed over a predetermined period of time, the setting of the power management mode is finished.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
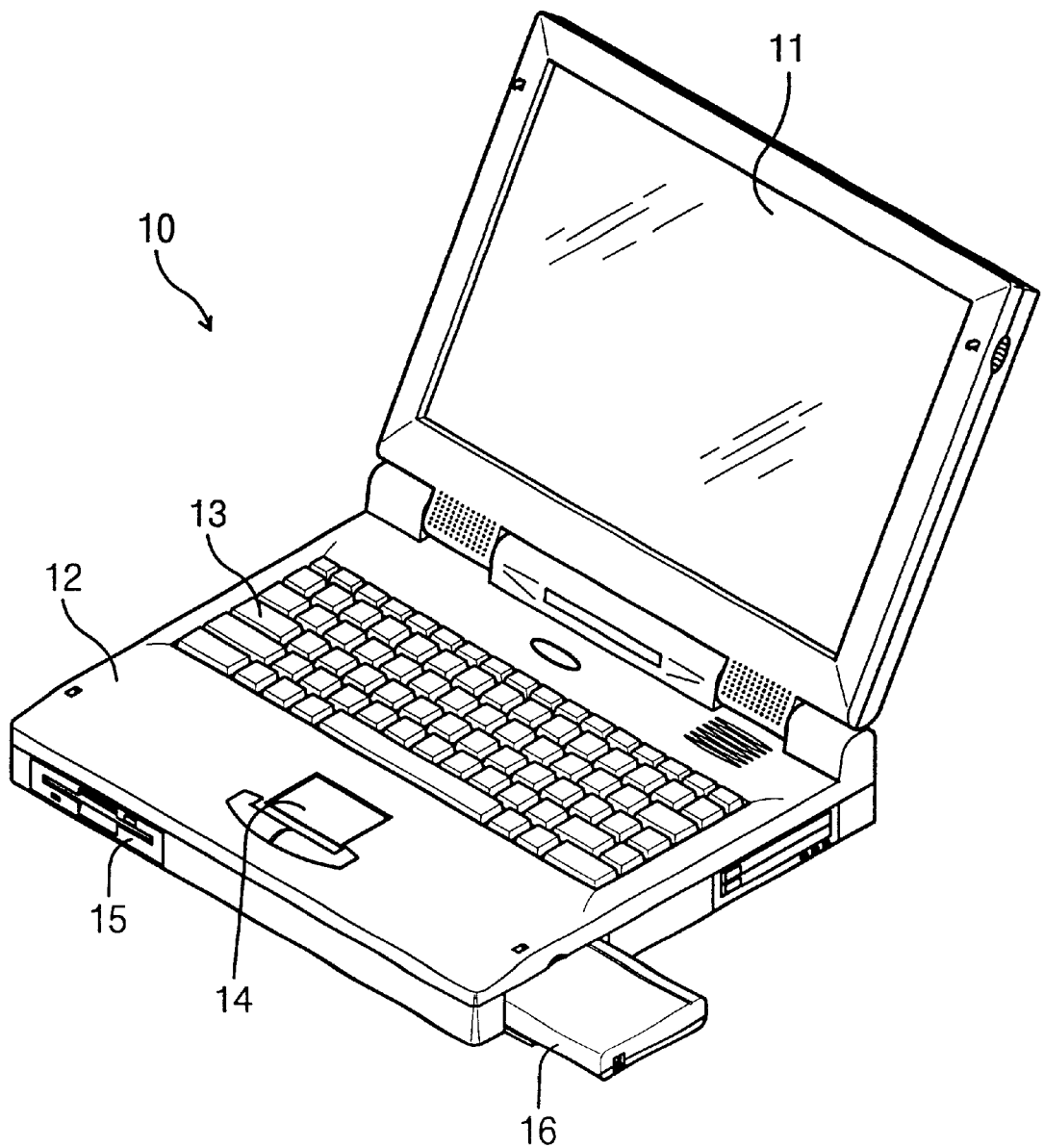
FIG. 1 is a perspective view illustrating an exterior view of a portable computer system.

FIG. 1 illustrates the portable computer disclosed in the Description of the Related Art noted above.

FIG. 1 illustrates a portable computer 10 having a computer body 12, a liquid crystal display panel 11 which is combined with a hinge of the computer body 12, a keyboard 13, a touch pad 14, a floppy disk drive 15, and a battery 16.

Figure 2:
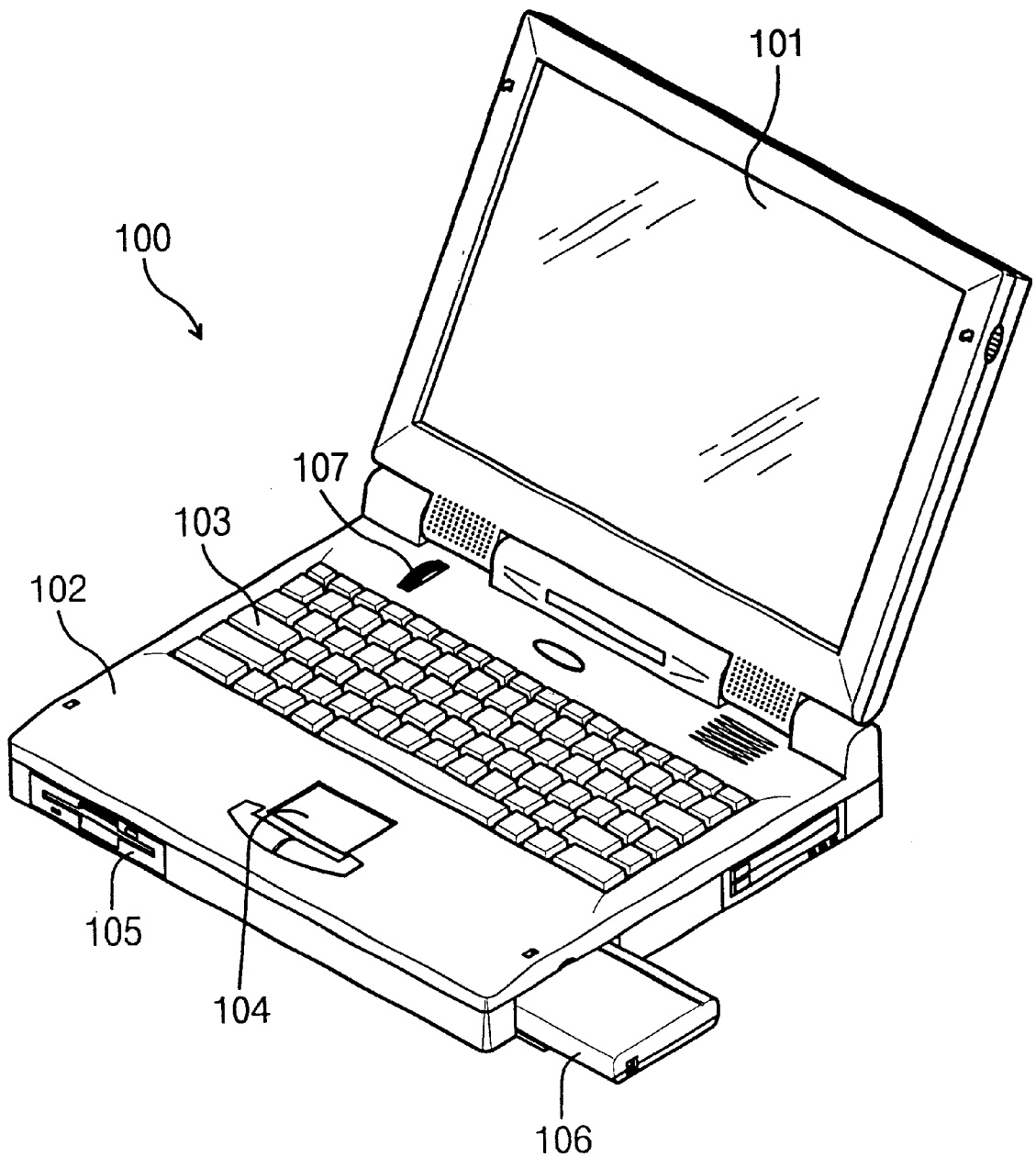
FIG. 2 is a perspective view illustrating an exterior view of a portable computer system of this invention.

Referring to FIG. 2, a portable computer 100 includes a computer body 102, a liquid crystal display (LCD) panel 101 which is combined with a hinge of the computer body 102 and shows display data, a keyboard 103 combined with a top of the computer body 102, a touch pad 104 used as a pointing device, a floppy disk drive 105, a battery 106 supplying power for operating the portable computer 100, and a power mode selector 107.

The power mode selector 107 is arranged on the computer body 102, and is a control key which is movable upward and downward. The power mode selector 107 maybe anyone of a touch pad, a rotary switch, and a slide bar. If the user moves the power mode selector 107 upward or downward after the portable computer 100 is powered on, a menu for selecting the power management mode is displayed on the LCD panel 101. When the user moves the power selector 107 upward or downward again, a selection bar is moved in the moving direction (i.e., upward or downward) of the power mode selector 107. The selected result is expressed by the state of each mode of the menu, which is displayed on the LCD panel 101.

If the user presses a specific key (for example, the ESC key) of the keyboard 103 or does not move the power mode selector 107 over a predetermined period of time, the menu disappears from the LCD panel 101, and a selected mode is then set as the power management mode.

Figure 3:
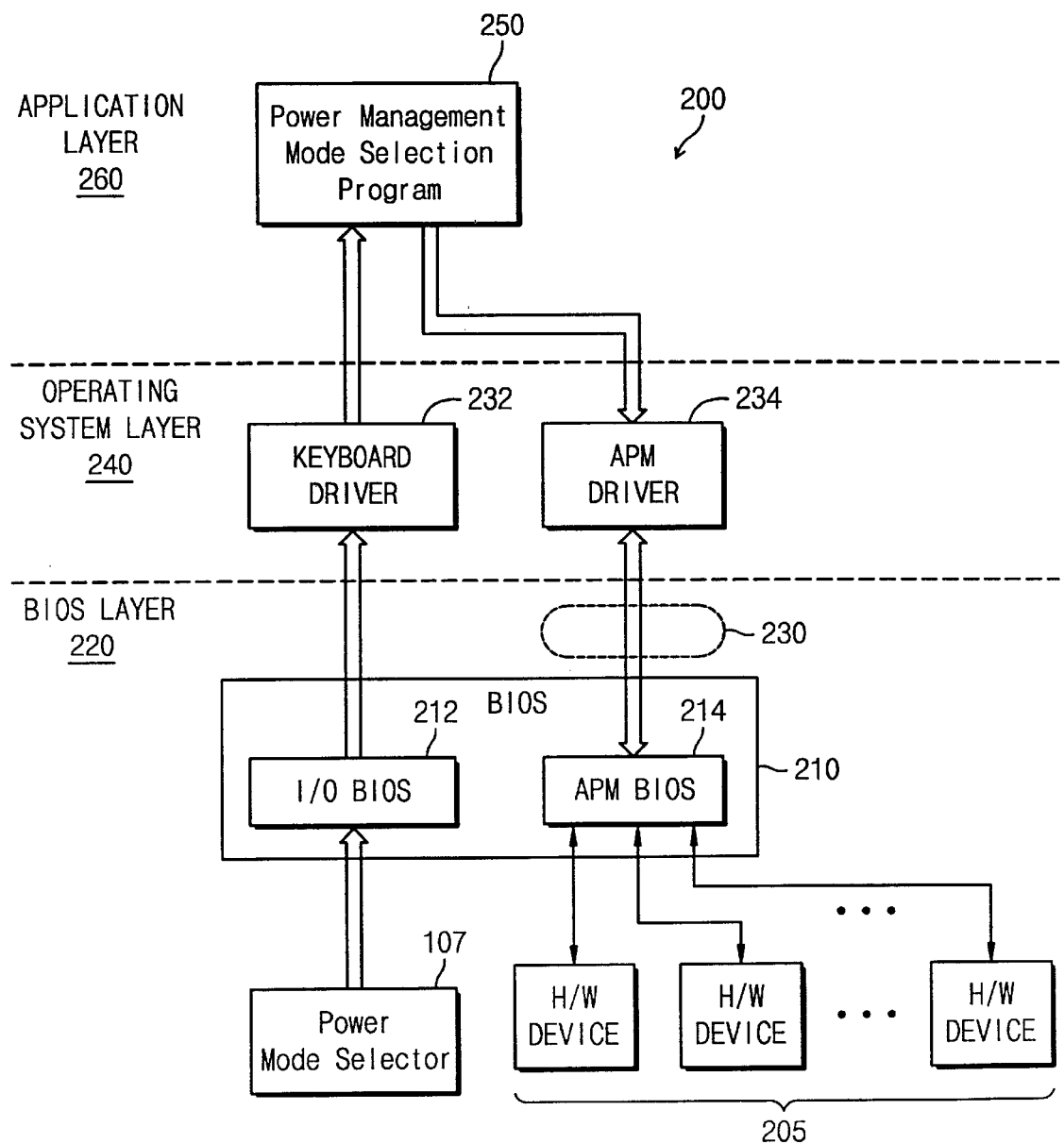
FIG. 3 is a block diagram illustrating the internal circuit composition of an advanced power management (APM) system for performing a power management mode.

Referring to FIG. 3, an APM system includes a BIOS layer 220 including a BIOS 210, an operating system layer 240 including a keyboard driver 232 and an APM driver 234, and an application layer 260 including a power management mode selection program 250. The composition of the APM system is aimed at the reduction of power consumption.

The BIOS 210 includes an I/O BIOS 212 having a routine for operating a screen, a keyboard, a serial communication port, a printer, a floppy disk and an APM BIOS 214, which is a software interface for performing the power management of the hardware devices 205.

An APM interface 230 is a protocol for transmitting a message between the APM BIOS 214 and the APM driver 234.

The keyboard driver 232 and the APM driver 234 are virtual device drivers supported by an operating system (OS). These drivers each include a plurality of software routines for performing a special operation.

If a key value inputted by the power mode selector 107 is inputted through the I/O BIOS 212, the keyboard driver 232 transmits the key value to the power management selection program 250. The selection program 250 is stored in a main memory (not shown) of the portable computer 100.

If the power mode selector 107 is moved, the power management selection program 250 displays the menu for selecting the power management mode on the LCD panel 101. According to the key value inputted by the power mode selector 107, the state thereof are displayed. If the user presses a specific key (for example, the ESC key) or does not move the power mode selector 107 over a predetermined period of time, the menu disappears from the LCD panel 101, and the selected mode is then set as the power management mode. The power management mode is a mode in which the portable computer 100 is not operated, and the power-down time of each hardware device 250 is preset for each mode.

The APM driver 234 transmits the power management mode set in the power management mode selection program 250 to the APM BIOS 214 through the APM interface 230. The APM BIOS 214 controls the power-up/down of each hardware device 250 in accordance with the power management mode.

Figure 4:
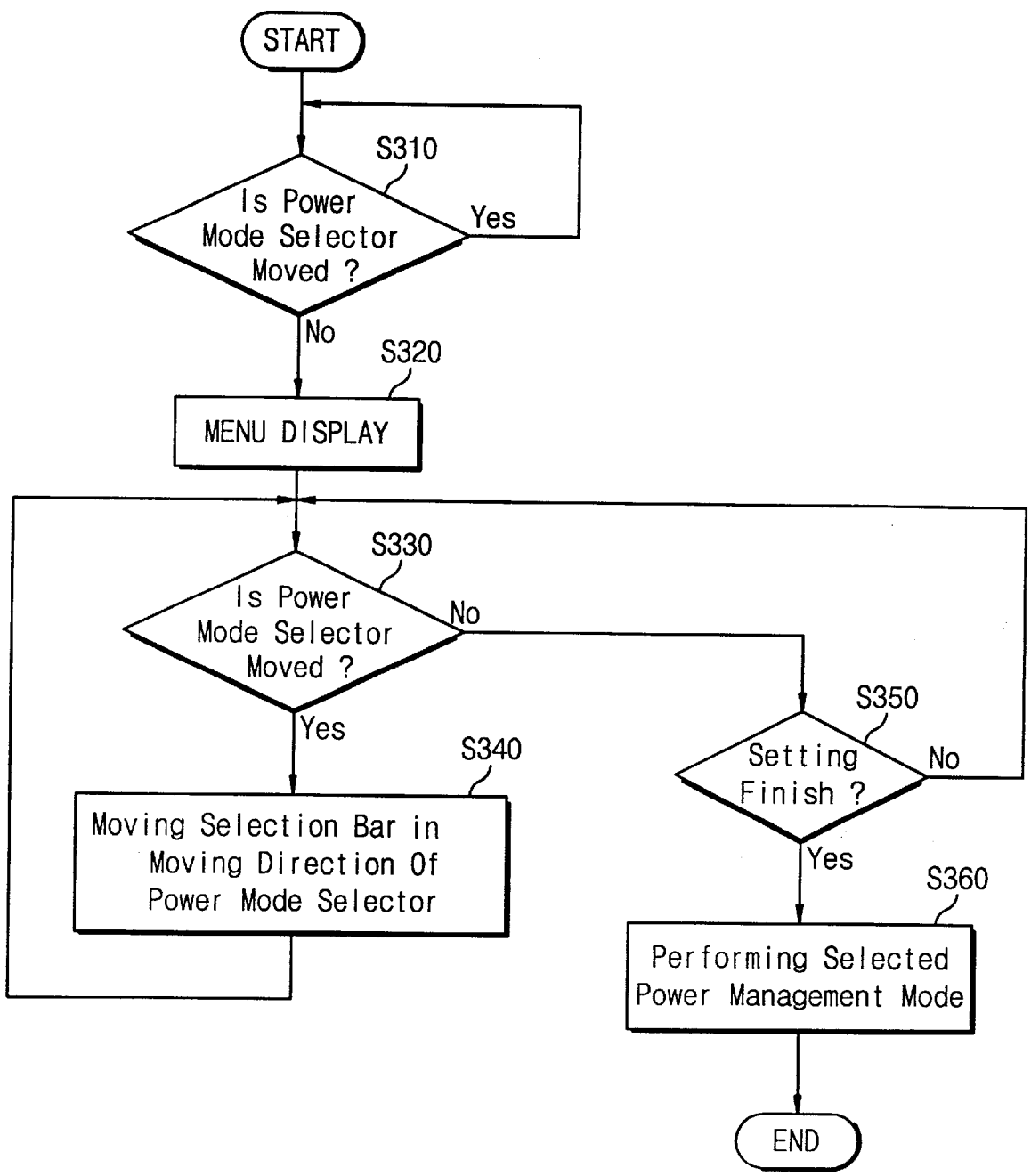
FIG. 4 is a flowchart illustrating the control steps of a power management mode selection program performed in a computer system of this invention.

Referring to FIG. 4, at step S310, it is determined whether the power mode selector 107 is moved. If so, control flow proceeds to step S320 wherein the menu for selecting the power management mode is displayed on the LCD panel 101. Since each of the hardware devices 205 have preset power-down times for each mode, the user can select one of the selectable power management modes.

At step S330, it is determined whether the power mode selector 107 has been moved. If the power mode selector 107 has been moved, the control flow continues to step S340, wherein the selection bar is moved in the moving direction (e.g., upward or downward) of the power mode selector 107. After the movement of the selection bar, the flow returns to the step S330. If the power mode selector has not been moved in step S330, the flow proceeds to step S350.

At step S350, it is determined whether the setting of the power management mode is finished. If the user presses a specific key (for example, the ESC key) of the keyboard 103 or does not move the power mode selector 107 over a predetermined period of time, the setting is finished. If the setting is finished, the flow proceeds to step S360, wherein the selected power management mode is performed. If the setting is not finished, the flow returns to the step S330.

As mentioned above, if the user wants to set the power management mode in the computer system of this invention, the setting of the power management mode is performed only by moving the power mode selector upward and downward. It is, therefore, possible to remedy a drawback in that the user must set the power-down time of each hardware device. Beginners can easily set the power management mode, too, thereby reducing unnecessary power consumption of a computer.

Further, it is possible to implement a hardware in which the power management mode can be selected by moving the power mode selector 107 as well as by pressing the page up and page down keys of the keyboard or by using the pointing device, when the menu for selecting the power management mode is displayed.

Figure 5:
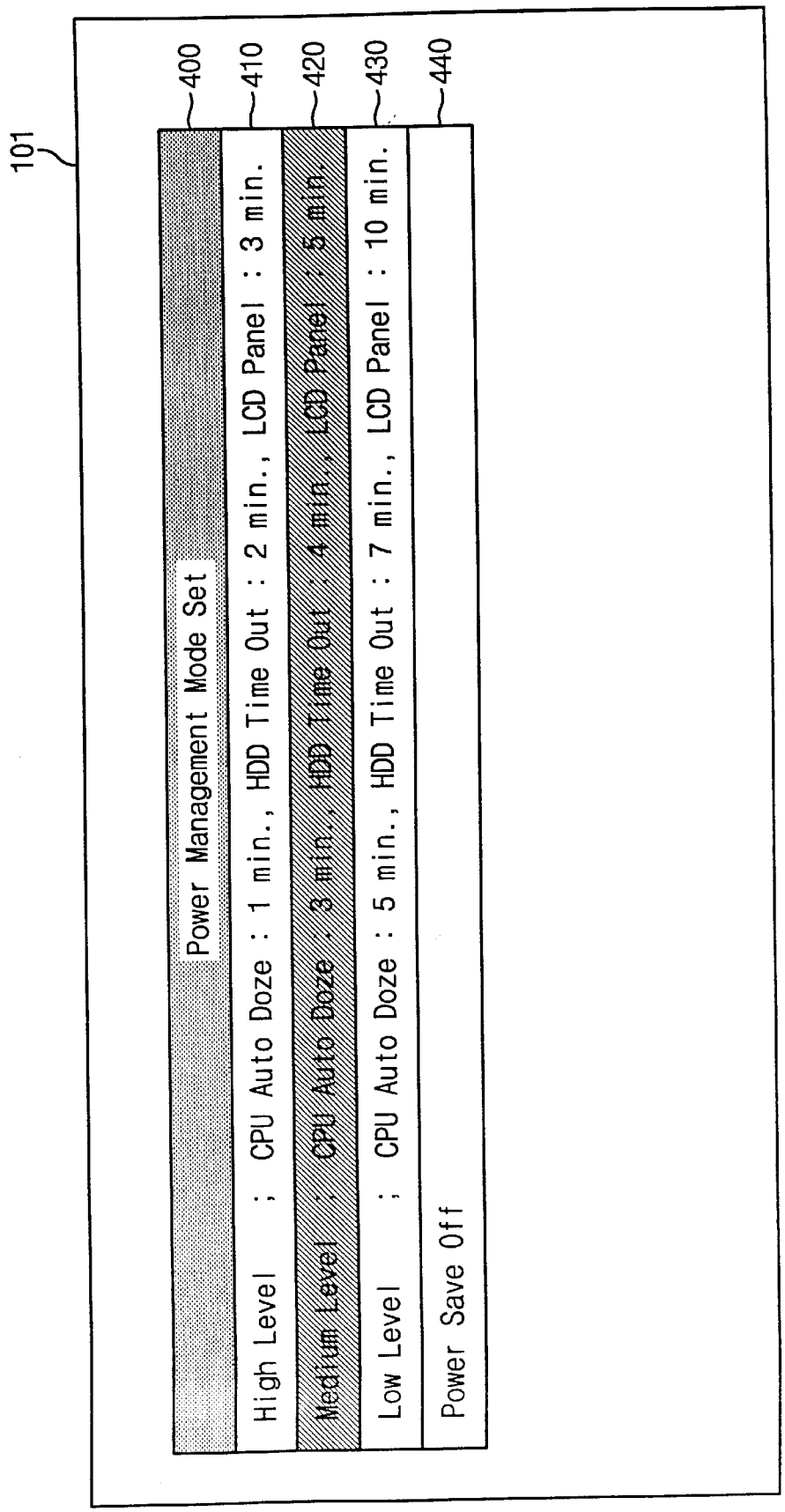
FIG. 5 is an exemplary view of a user interface for setting a power management mode, as displayed on a screen.

Referring to FIG. 5, for example, if the power management mode is divided into four modes, the setting of each mode is as follows:

(1) a first high-level power save mode, wherein the respective power-downtimes of the CPU, the hard disk drive, and the LCD panel are set to 1, 2, and 3 minutes (that is, if 1, 2, and 3 minutes have passed without operating the computer system, each of the hardware devices is powered down) (refer to 410 of FIG. 5);

(2) a second medium-level power save mode, wherein the respective power-down times of the CPU, the hard disk drive, and the LCD panel are set to 3, 4, and 5 minutes (refer to 420 of FIG. 5);

(3) a third low-level power save mode, wherein the respective power-down times of the CPU, the hard disk drive, and the LCD panel are set to 5, 7, and 10 minutes (refer to 430 of FIG. 5); and (4) a fourth power save off mode, to disable the power management mode.

If the first mode (that is, the high-level power save mode) is selected, the greatest power management function may be performed.

According to the present invention, a user can set a power management mode merely by moving a power mode selector upward and downward. It is, therefore, possible to remedy a drawback in that the user must set the power-down time of each hardware device. Beginners can easily set the power management mode, too, thereby reducing unnecessary power consumption of a computer.

Having described the present invention with reference to a specific embodiment, the above description is intended to illustrate the operation of the preferred embodiments and is not meant to limit the scope of the invention. The scope of the invention is to be delimited only by the following claims. From the above discussion, many variations will be apparent to those skilled in the art that would yet be encompassed by the true spirit and scope of the present invention.

What is claimed is:

1. A computer system, comprising:

a plurality of hardware devices;

a power mode selector disposed on said computer system, for selecting one of a plurality of predetermined power management modes, displaying a menu for selecting one of the plurality of predetermined power management modes upon said power mode selector being moved, selecting one of the power management modes in response to the moving of said power mode selector, and setting the selected power management mode as a power management mode of the computer system; and a system power manager for managing the computer system power in response to the selected power management mode.

2. The computer system of claim 1, said power mode selector being one of a touch pad, a rotary switch, and a slide bar.

3. The computer system of claim 1, said plurality of hardware devices comprising: a central processing unit (CPU), a hard disk drive (HDD), and a display monitor.

4. The computer system of claim 3, said display monitor displaying the menu of said plurality of predetermined power management modes.

5. The computer system of claim 3, said plurality of power management modes comprising: a high-level power save mode, a medium-level power save mode, and a power save off mode.

6. The computer system of claim 1, the power of a central processing unit, hard disk drive, and display monitor being controlled in each of said power management modes.

7. The computer system of claim 3, said power mode selector being one of a touch pad, a rotary switch, and a slide bar.

8. The computer system of claim 4, said power mode selector being one of a touch pad, a rotary switch, and a slide bar.

9. The computer system of claim 5, said power mode selector being one of a touch pad, a rotary switch, and a slide bar.

10. The computer system of claim 6, said power mode selector being one of a touch pad, a rotary switch and a slide bar.

11. The computer system of claim 1, said plurality of power management modes comprising: a high-level power save mode, a medium-level power save mode, and a power save off mode.

12. The computer system of claim 2, said plurality of power management modes comprising: a high-level power save mode, a medium-level power save mode, and a power save off mode.

13. The computer system of claim 4, said plurality of power management modes comprising: a high-level power save mode, a medium-level power save mode, and a power save off mode.

14. The computer system of claim 6, said plurality of power management modes comprising: a high-level power save mode, a medium-level power save mode, and a power save off mode.

15. The computer system of claim 3, the power of said central processing unit, hard disk drive, and display monitor being controlled in each of said power management modes.

16. The computer system of claim 4, the power of said central processing unit, hard disk drive, and display monitor being controlled in each of said power management modes.

17. The computer system of claim 5, the power of said central processing unit, hard disk drive, and display monitor being controlled in each of said power management modes.

18. A user interface method for setting a power management mode of a computer system with a movable power mode selector, comprising the steps of:

displaying a menu for selecting one of a plurality of power management modes upon said power mode selector being moved;

selecting one power management mode in response to the moving of said power mode selector; and setting the selected power management mode as a power management mode of the computer system.

19. The method of claim 18, the setting step being finished upon said power mode selector not being moved over a predetermined period of time.

20. The method of claim 18, the setting step being finished upon a specific key being inputted from a keyboard.

21. A computer system, comprising:

a plurality of hardware devices;

a power mode selector disposed on said computer system, accommodating a selecting of one of a plurality of predetermined power management modes, and displaying a menu accommodating the selecting of one of the plurality of predetermined power management modes upon said power mode selector being moved; and a system power manager accommodating a managing of the computer system power in response to the selected power management mode.

\* \* \* \* \*